(12) United States Patent
Kress et al.

(10) Patent No.: US 10,152,761 B2
(45) Date of Patent: Dec. 11, 2018

(54) FACILITATING TRANSACTIONS FOR HEALTH APPLICATIONS DESIGNED FOR MOBILE DEVICES

(71) Applicant: IMS Health Incorporated, Danbury, CT (US)

(72) Inventors: Andrew Kress, Haverford, PA (US); Matthew Tindall, Jersey City, NJ (US); John MacCarthy, Bourne End (GB); Hossam Sadek, Phoenixville, PA (US)

(73) Assignee: IQVIA INC., Parsippany, NY (US)

( * ) Notice: Subject to any disclaimer, the term of this patent is extended or adjusted under 35 U.S.C. 154(b) by 230 days.

(21) Appl. No.: 14/046,603

(22) Filed: Oct. 4, 2013

(65) Prior Publication Data

US 2015/0100328 A1    Apr. 9, 2015

(51) Int. Cl.
  *G06Q 50/22*    (2018.01)
  *G06Q 30/06*    (2012.01)

(52) U.S. Cl.
  CPC ......... *G06Q 50/22* (2013.01); *G06Q 30/0631* (2013.01)

(58) Field of Classification Search
  CPC ... G06C 30/0631; G06C 50/22; G06F 19/328; G06F 19/3418; G06F 19/3456; G06F 19/00; H04M 15/61; H04M 15/68; G06Q 30/0631; G06Q 50/22
  USPC .......................................................... 705/2
  See application file for complete search history.

(56) References Cited

U.S. PATENT DOCUMENTS

| | | | |
|---|---|---|---|
| 8,380,540 B1* | 2/2013 | Smith et al. | 705/3 |
| 2003/0050799 A1* | 3/2003 | Jay et al. | 705/2 |
| 2008/0133265 A1* | 6/2008 | Silkaitis | G06Q 50/22 705/2 |
| 2009/0204434 A1* | 8/2009 | Breazeale, Jr. | G06F 19/327 705/3 |
| 2010/0112983 A1* | 5/2010 | Walker | H04L 41/0806 455/411 |
| 2011/0022515 A1* | 1/2011 | Tallitsch et al. | 705/40 |
| 2011/0119075 A1* | 5/2011 | Dhoble | G06F 19/3456 705/2 |
| 2013/0312066 A1* | 11/2013 | Suarez | G06F 19/3418 726/4 |

(Continued)

*Primary Examiner* — Hiep V Nguyen
(74) *Attorney, Agent, or Firm* — Fish & Richardson P.C.

(57) ABSTRACT

Methods, systems, and apparatus, including computer programs encoded on computer storage media, for facilitating transactions for health-related computing products (e.g., mobile health applications or health-related devices). One method includes storing a plurality of lists, each list including health-related computing products approved for compensation by a payer entity. A claim for a health-related computing product is received from a user. The list with which the user is associated is determined. A determination is made whether the health-related computing product included in the claim is listed in the list with which the user is determined to be associated. When the health-related computing product is determined to be listed in the list with which the user is determined to be associated, compensation by the payer is authorized. However, when the health-related computing product is not determined to be listed in the list with which the user is determined to be associated, compensation by the payer is declined.

22 Claims, 5 Drawing Sheets

(56) References Cited

U.S. PATENT DOCUMENTS

2014/0040876 A1* 2/2014 Morley .................... G06F 8/61
                                                   717/172
2015/0012283 A1* 1/2015 Ryan .................. G06F 19/3437
                                                    705/2

* cited by examiner

FACILITATING TRANSACTIONS FOR HEALTH APPLICATIONS DESIGNED FOR MOBILE DEVICES

BACKGROUND

The use of health-related applications designed for mobile devices is emerging as a means of increasing patient engagement in their health and reducing health system costs, especially in the USA. Physicians have indicated interest in prescribing health application for their patients and payers (e.g., insurance companies) have begun promoting health applications designed for mobile devices to their members. Other groups including employers, patient organizations and pharmaceutical companies are also promoting such health applications.

SUMMARY

The present disclosure relates to computer-implemented methods, software, and systems for facilitating transactions for health applications designed for mobile devices. In one aspect, a computer-implemented method includes storing, by one or more computer processors, a plurality of lists, each list including health-related computing products approved for compensation by a payer entity; receiving, at the one or more computer processors, a claim for a health-related computing product, the claim including information associated with a recommendation of the health-related computing product to at least one user; determining, by the one or more computer processors, with which of the plurality of lists the at least one user is associated; determining, by the one or more computer processors, whether the health-related computing product recommended to the at least one user is listed in the list with which the user is determined to be associated; when the health-related computing product is determined to be listed in the list with which the at least one user is determined to be associated, authorizing, by the one or more computer processors, compensation by the payer for the health-related computing product; and when the health-related computing product is not determined to be listed in the list with which the at least one user is determined to be associated, declining, by the one or more computer processors, compensation by the payer for the health-related computing product.

In another aspect, a computer-implemented method includes storing, by one or more computer processors, a plurality of formulary data structures, each formulary data structure being associated with one of a plurality of health plans and including a list of mobile applications approved for compensation by the associated health plan; receiving, at the one or more computer processors, a claim for a mobile application, the claim including information associated with a recommendation of the mobile application to a user, and the mobile application being configured to operate on a mobile device of the user; determining, using the one or more computer processors, with which of the plurality of health plans the user is associated; determining, using the one or more computer processors, whether the health plan with which the user is determined to be associated covers the prescription of the mobile application to the user by determining whether the mobile application is listed in the formulary associated with the health plan with which the patient is determined to be associated; when the prescription of the mobile application to the patient is determined to be covered by the health plan, authorizing, using the one or more computer processors, compensation by the health plan for the mobile application; and when the prescription of the mobile application to the patient is determined not to be covered by the health plan, declining, using the one or more computer processors, compensation by the health plan for the mobile application.

Other implementations of these aspects include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by a data processing apparatus, cause the apparatus to perform the actions.

These and other aspects may each optionally include one or more of the following features. Authorizing compensation by the health plan for the mobile application may include requesting payment of a cost of the mobile application from the health plan with which the patient is determined to be associated. Authorizing compensation by the health plan for the mobile application may also include remitting payment of the cost the mobile application to a provider of the mobile application.

Authorizing compensation by the health plan for the mobile application may include determining that the health plan with which the patient is determined to be associated covers an entire cost of the mobile application. Authorizing compensation by the health plan for the mobile application may also include, based on determining that the health plan covers the entire cost of the mobile application, providing the patient with a mechanism for downloading the mobile application.

Compensation by the health plan for the mobile application may include determining that the health plan with which the patient is determined to be associated requires the patient to pay at least a portion of a cost of the mobile application. Compensation by the health plan for the mobile application may also include causing a request to be sent to the patient requesting payment of the portion of the cost of the mobile application. Compensation by the health plan for the mobile application may also include receiving, at the one or more computer processors, payment information indicating acceptance by the patient of the portion of the cost of the mobile application; and after receiving payment information indicating acceptance by the patient of the portion of the cost of the mobile application, providing, by the one or more computer processors, the patient with a mechanism for downloading the mobile application.

Determining whether the health plan with which the patient is determined to be associated covers the prescription of the mobile application to the patient further may include determining whether a physician that provided the prescription is authorized to prescribe the mobile application.

The aspects may also include identifying a plurality of mobile applications that are related to health care; categorizing the identified plurality of mobile applications into one or more groups based on one or more functions of each mobile application in relation to health care; storing a list of the identified plurality of mobile applications, the categorizations for each of the identified plurality of mobile applications, and a real cost associated with each of the identified plurality of mobile applications, wherein the real cost comprises a cost to initially download the mobile application and any continuing costs necessary for continued use of the mobile application; providing an interface to a payer that enables the payer to search the stored list of the identified plurality of mobile applications based on the categorizations for each of the identified plurality of mobile applications; receiving, through the interface, input from the payer to add a mobile application to a formulary data structure associated with the payer, the input including an indication of an amount and type of compensation the payer will provide for the mobile health application; and adding the mobile application to the formulary data structure associated with the payer including the indication of the amount and type of compensation the payer will provide for the mobile health application.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for facilitating transactions for health-related computing products (e.g., mobile health applications or health-related devices). For illustration purposes, the various implementations described herein will be described with regard to a mobile health application transaction system that provides a mechanism for the prescription or recommendation of mobile health applications and for the purchase and download of the mobile health applications. However, the described transaction system is equally applicable to all types of health-related computing products, including, but not limited to, any type of health-related software or hardware sold or otherwise provided to a user. Additionally or alternatively, the described transaction system may be configured to facilitate transactions in other types of software or hardware (e.g., education-related software or hardware).

As the market for mobile health applications matures and more become available, it is expected that health insurers will be willing to compensate their members for the cost or use of certain mobile health applications prescribed by a health care provider. It is also expected that other organizations (e.g., employers, patient organizations and pharmaceutical companies) will also compensate members for a specific set of mobile health applications. Moreover, these payers may also be interested in offering other benefits to a user for the installation and use of a mobile health application. For example, a pharmaceutical company may be interested in providing a user with a discount on future purchases of a drug, if a user installs an application associate with the drug.

The mobile health application transaction system described herein facilitates this compensation process. Furthermore, the mobile health application transaction system characterizes and categorizes each mobile health application, facilitates purchase or distribution of that mobile health application electronically (similar in nature to the way a pharmacy works), and adjudicates claims for payment related to formularies of assets or combinations thereof established by paying constituents (e.g., insurance companies or employers). In addition to mobile health applications, the mobile health application transaction system may be configured to facilitate transactions involving mobile medical devices (e.g., wearable sensors) or combinations of mobile medical devices and mobile medical applications.

Figure 1:
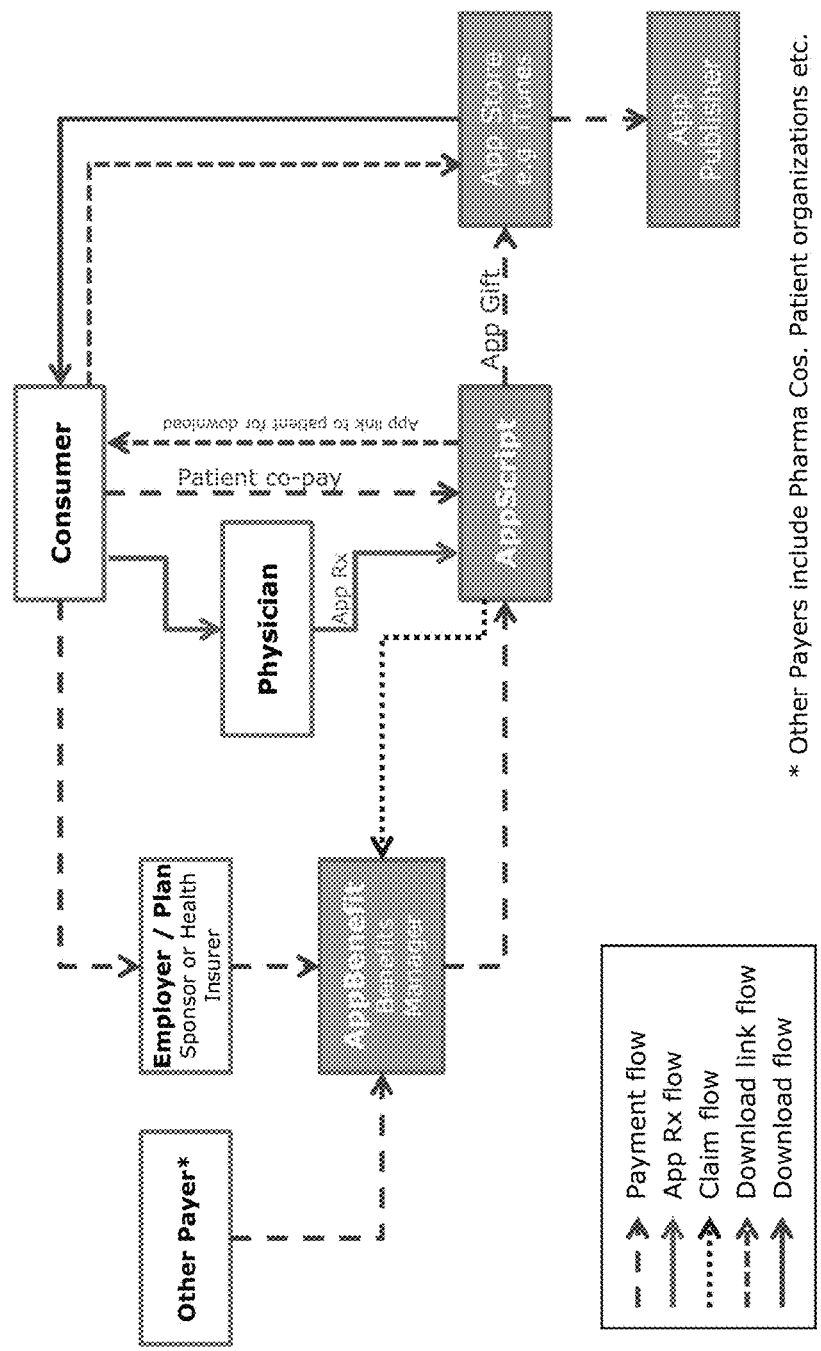
FIG. 1 is a block diagram illustrating an example system for facilitating transactions for health applications designed for mobile devices.

FIG. 1 is a block diagram illustrating an example system for facilitating transactions for health applications designed for mobile devices (i.e., mobile health applications). Specifically, FIG. 1 illustrates a mobile health application transaction system 100 that includes an application prescription/recommendation component (hereinafter "recommendation component") 102, a benefits management component 104, and a mobile application store component 106 (e.g., Apple iTunes). The application prescription/recommendation component 102 and benefits management component 104 may represent different functions of a single computer program executed by one or more computers. Alternatively, the application prescription/recommendation component 102 and benefits management component 104 may each be one or more separate computer programs executed by one or more computers.

As illustrated in FIG. 1, a consumer 108 may visit a health care provider 110 and receive a prescription or other form of recommendation for a mobile health application. The health care provider 110 may be any professional that provides healthcare advice or services, including, for example, a general physician, a specialist, or a nurse. The health care provider 110 provides the prescription or other form of recommendation through the recommendation component 102. In some implementations, the recommendation component 102 may be an application installed on the health care provider's computing device or may be a web portal with which the health care provider 110 interacts through, for example, a web browser on the health care provider's computing device. Additionally or alternatively, the person recommending the mobile health application could be any person or entity with access to the recommendation component 102.

The recommendation component 102 receives the prescription or other form of recommendation from the health care provider 110 and processes it. In some implementations, as part of processing the prescription or other form of recommendation, the recommendation component 102 is configured to request information from the consumer 108 regarding the prescription of the mobile health application. For example, the recommendation component 102 may include an application installed on the consumer's computing device (e.g., cell phone or personal computer). The application installed on the consumer's computing device may notify the consumer 108 (e.g., through a visual and/or audio notification on the consumer's cell phone) that the application requires the consumer's input. Additionally or alternatively, the consumer 108 may interact with the recommendation component 102 through a web portal and the recommendation component 102 may notify the consumer 108 of a need for input through a suitable communication means (e.g., an e-mail, an SMS message, or an MMS message). In some implementations, the recommendation component 102 does not directly notify the consumer 108 of a need for input, but waits until the consumer 108 voluntarily interacts with the recommendation component 102 and provides the necessary input to proceed.

The input from consumer 108 requested by recommendation component 102 may take various forms. For example, in some implementations, the recommendation component 102 may require the consumer 108 to input information about the consumer's health insurance plan, employer, and/or any other person or entity that may have an interest in the provision of the mobile health application to the consumer 108. Alternatively, the recommendation component 102 may automatically search for the consumer's payer information in one or more storage devices, display retrieved payer information to the consumer 108, and request consumer 108 to confirm the accuracy of the retrieved payer information. Additionally or alternatively, the recommendation component 102 may be configured to display details of the prescription/recommendation to the consumer 108 (e.g., physician name, name of the mobile health application, and/or cost of the mobile health application) and request that the consumer accept or reject the prescription/recommendation.

In some implementations, the recommendation component 102 may determine that some form of payment is necessary to provide the consumer 108 with the mobile health application. In such cases, the recommendation component 102 may be configured to request input from the consumer 108 as to how the consumer 108 would prefer to pay for the mobile health application. For example, the recommendation component 102 may be configured to request permission from the consumer 108 to submit a claim to a payer (e.g., the consumer's health insurance plan 112 or other payer 114 such as the consumer's employer) for the payment. Additionally or alternatively, the recommendation component 102 may be configured to accept payment directly from the consumer 108.

In the case where the consumer requests a claim be submitted to a payer for payment of the mobile health application, the recommendation component 102 may be configured to submit the claims to the benefits management component 104 for processing. The benefits management component 104 stores information about one or more payers and their compensation authorization for various mobile health applications. In some implementations, the benefits management component 104 comprises at least two repositories of information. The first repository is an extensive categorized listing of mobile health applications. The second repository comprises formulary data structures that each list the mobile health applications for which a particular payer has authorized compensation, as well as the amount of compensation authorized. Both of these repositories will be discussed in greater detail below with regard to FIG. 3.

The benefits management component 104 is configured to process claims received from the recommendation component 102 based on the stored information about the one or more payers and their compensation authorization for various mobile health applications. In some implementations, for example, the benefits management component 104 receives a claim from the recommendation component 102 that includes an indication of a particular mobile health application for which a particular consumer 108 is requesting compensation. Based on the received claims, the benefits management component 104 may determine one or more payers from which compensation should be requested on behalf of the consumer 108. In some implementations, an indication of the one or more payers from which compensation should be requested is received as part of the claim. In other implementations, the benefits management component 104 may store associations between consumers and payers and query these stored associations when processing a claim.

Once the benefits management component 104 determines the one or more payers from which compensation should be requested, the benefits management component 104 may be configured to access a formulary data structure associated with each of the determined payers. As will be described in greater detail below with regard to FIG. 3, the formulary data structure stores an indication of one or more mobile health applications that the payer has authorized for compensation. The formulary data structure may also store an indication of the amount and type of compensation the payer is willing to provide for each of the one or more mobile health applications. The benefits management component 104 may determine whether an indication of the mobile health application included in the received claim is stored in the formulary data structures associated with the one or more payers and determine the amount and type of compensation the payer is willing to provide for the mobile health application.

If the mobile health application is not included in the formulary data structures associated with the one or more payers from which compensation should be requested, the benefits management component 104 may be configured to send a response to the recommendation component 102 indicating that the received claim has been denied. If, however, the mobile health application is included in one or more of the formulary data structures associated with the one or more payers from which compensation should be requested, the benefits management component 104 may be configured to send a response to the recommendation component 102 that accepts the claim and indicates the amount and type of compensation associated with the mobile health application that the one or more payers have authorized.

For example, in some implementations, the one or more payers may authorize payment of a portion or all of the cost of the mobile health application. Accordingly, the benefits management component 104 may be configured to submit a request to the one or more payers for payment of the amount(s) authorized. Additionally or alternatively, the one or more payers may authorize certain monetary and/or non-monetary benefits to be provided to a user in exchange for installation and use of a mobile health application. Accordingly, the benefits management component 104 may be configured to notify a user of the benefit and notify the payer that the user has downloaded and installed a particular mobile health application, such that the payer may cause the associated benefits to be provided to the user. For example, an employer may decide to discount a user's health insurance premium, the user installs and uses a health tracking application. Thus, in addition to or in lieu of paying for a portion or all of the cost of the application, the payer may indicate to the user that installation of the mobile health application will result in the current or future provision of a benefit.

When the recommendation component 102 receives a response from the benefits management component 104 that the claim has been declined, the recommendation component 102 may be configured to notify the consumer 108 that the claim has been declined. In some implementations, the recommendation component 102 may be further configured to request whether the consumer would like to pay for the cost of the mobile health application himself/herself. On the other hand, when the recommendation component 102 receives a response from the benefits management component 104 that the claim has been accepted, the recommendation component 102 may determine whether the authorized compensation is a portion of the cost of the mobile health application and whether the authorized amount of compensation covers the entire cost of the mobile health application. If not, the recommendation component 102 may be configured to request payment of the remaining portion of the cost from the consumer 108.

For example, if the consumer 108 has a health insurance plan that requires a co pay or that otherwise does not cover the total cost of the mobile health application, the consumer 108 may be notified that they will need to pay a particular amount. Where the recommendation component 102 determines that the consumer 108 is required to pay for a portion or all of the cost of the mobile health application, the recommendation component 102 may be configured to prompt the consumer 108 for information about the manner in which the consumer 108 will pay for the cost of the mobile health application. For example, the consumer 108 may provide a credit card number or gift code to the recommendation component 102.

Once the recommendation component 102 has confirmed that the total cost of the mobile health application has been paid by one or more payers and/or the consumer 108 (or determines that the mobile health application is free), the recommendation component 102 either directly or indirectly provides the mobile health application to the consumer 108. In some implementations, for example, the recommendation component 102 may be configured to send a link to the consumer's computing device that, when followed by the consumer 108, will cause the consumer's computing device to download the mobile health application from the mobile application store component 106. Additionally or alternatively, the recommendation component 102 may be configured to retrieve a copy of the mobile health application from the mobile application store component 106 and send the copy of the mobile health application to the consumer's computing device.

In some implementations, there may be multiple mobile application store components 106, and the recommendation component 102 may be configured to determine the appropriate mobile application store component 106 from which the consumer should receive the mobile health application. For example, the recommendation component 102 may determine the type of the consumer's computing device (e.g., an Apple® device or Android®-based device) and determine a mobile application store component 106 (e.g., Apple iTunes® or Google Play®) associated with the type of computing device. Alternatively, in some implementations, the mobile health application may be provided directly by an application developer/publisher 116 or other third-party supplier (e.g., a healthcare-related company, such as a pharmaceutical company). In such implementations, the recommendation component 102 may be configured to interface with the third-party supplier to provide the mobile health application to the consumer 108.

As part of proving the mobile health application to the consumer 108, the recommendation component 102 is also configured, when appropriate, to dispense payment for the mobile health application. When the mobile health application is provided by a mobile application store component 106, for example, the recommendation component 102 may be configured to purchase the mobile health application from the mobile application store component 106 and cause the mobile health application to be transferred to the consumer 108 (e.g., by "gifting" the purchased mobile health application to the consumer 108). The mobile application store component 106 may be configured to then make a payment to a publisher of the mobile health application related to the sale of the mobile health application.

The forgoing description of the mobile health application transaction system 100 has been focused on the recommendation of, payment for, and provision of a mobile health application. However, the mobile health application transaction system 100 may also be configured to manage or otherwise contribute to transactions involving health-related devices or combinations of health-related devices and mobile health application. For example, healthcare provider 110 may prescribe or otherwise recommend to the consumer 108 a wearable sensor (e.g., a heart-rate monitor) and a corresponding mobile health application that interfaces with the wearable sensor. The mobile health application transaction system 100 may be configured to process a claim for the wearable sensor and associated mobile health application in the same or similar manner as described above with regard to stand-alone mobile health applications.

Additionally or alternatively, the mobile health application transaction system 100 may be configured to complement an existing healthcare payment system. For example, the provision of certain health-related devices may be handled through a traditional insurance model (e.g., a claim is submitted by a healthcare provider to an insurance company). However, the traditional insurance model may not be capable of adjudicating transactions for mobile health applications associated with the health-related device. Therefore, the mobile health application transaction system 100 may be configured to receive an indication that the consumer 108 has been prescribed or otherwise purchased the health-related device, determine which mobile health applications correspond to the health-related device, and handle the payment and provision of these mobile health applications to consumer 108 through the process described above.

Additionally or alternatively, the mobile health application transaction system 100 may be configured to monitor a user's use of a mobile health application after installation. For example, in some implementations, a payer may authorize a user to be compensated with certain future benefits contingent on the user's continued use of a mobile health application. The mobile health application transaction system 100 may monitor the user's continued use of a mobile health application and send one or more updates to the payer including information about the user's continued use of a mobile health application.

Though the mobile health application transaction system 100 has been described with certain discrete components and as performing certain operations, the mobile health application transaction system 100 may include more or fewer components that perform these operations. For example, the recommendation component 102 and benefits management component 104 may be a single component. Additionally or alternatively, the operations described above with regard to the mobile health application transaction system 100 may be performed in a different order and/or other related operations may occur as part of the overall transaction processes.

Figure 2:
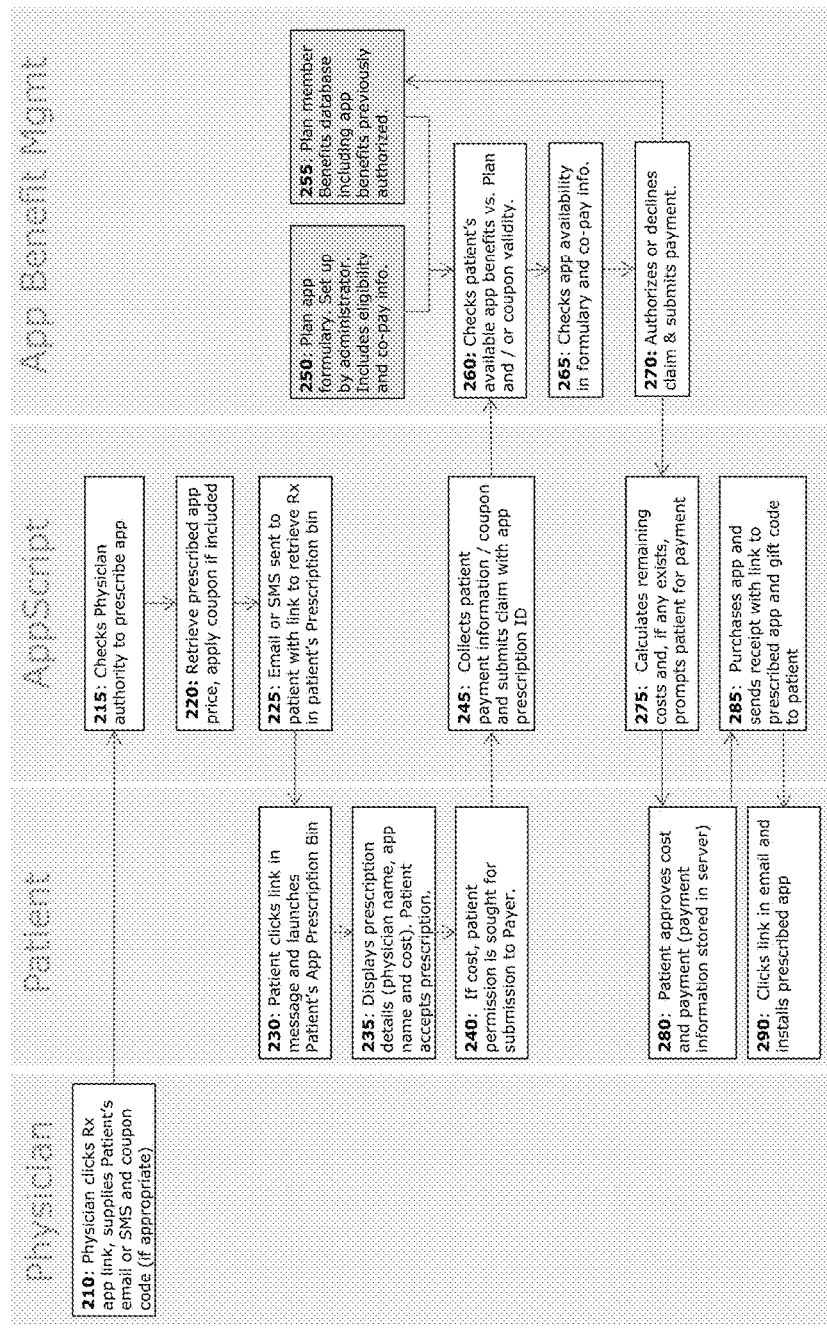
FIG. 2 is a flow chart of an example process for facilitating transactions for health applications designed for mobile devices.

FIG. 2 is a flow chart of an example process 200 for facilitating transactions for health applications designed for mobile devices. Though the operations of process 200 are illustrated in FIG. 2 as being performed by certain components of the mobile health application transaction system 100, the operations may be performed by other components or systems to similar effect.

At 210, healthcare provider 110 determines that he or she wants to prescribe or otherwise recommend a mobile health application or device to consumer 108, so the healthcare provider 110 interfaces with recommendation component 102. The healthcare provider 110 identifies the consumer 108 and the mobile health application or device to the recommendation component 102. In some implementations, the healthcare provider 110 may also provide a coupon code to the recommendation component 102 that will reduce or cover the cost of the mobile health application or device. Additionally or alternatively, operation 210 may be completed by someone other than a healthcare provider 110 (e.g., an employer, friend, and/or family member).

At 215, the recommendation component 102 may optionally be configured to determine whether the healthcare provider 110 is authorized to prescribe or otherwise recommend a mobile health application or device to consumer 108. If the healthcare provider 110 is authorized, at 220, the recommendation component 102 is configured to determine the cost of the mobile health application or device. If a coupon code was provided by the healthcare provider 110 during operation 210, the recommendation component 102 reduces the determined cost of the mobile health application or device by an amount associated with the coupon code.

At 225, the recommendation component 102 notifies the consumer 108 of the prescription/recommendation. In some implementations, the recommendation component 102 is configured to notify the consumer 108 by sending an SMS/MMS text message or an e-mail to the consumer 108. In other implementations, an interface component of the recommendation component 102 may be separately installed on the consumer's computing device. The recommendation component 102 may be configured to send a notification of the prescription/recommendation to this installed interface component.

At 230, the consumer 108 interfaces with the recommendation component 102 to view the prescription/recommendation. In some implementations, where an interface component of the recommendation component 102 is installed on the consumer's computing device, the user launches the interface component and views the prescription/recommendation. In other implementations, where the recommendation component 102 may be accessed through a web interface, the notification provided to the consumer 108 in operation 225 may include a link that the consumer 108 may follow to the recommendation component 102 web interface to view the prescription/recommendation.

At 235, the recommendation component 102 displays details of the prescription/recommendation to the consumer 108 and requests that the consumer approve acquisition of the mobile health application. In some implementations, the recommendation component 102 displays at least the name of the mobile health application, the name of the prescribing/recommending individual or entity, and the cost of the mobile health application, if any.

At 240, if the mobile health application has a cost, after reduction of the coupon code, greater the zero, the recommendation component 102 may be configured to request permission from the consumer 108 to submit a claim to one or more payers (e.g., the consumer's health insurance plan and/or employer) associated with the consumer 108. Alternatively, the recommendation component 102 may be configured to automatically submit a claim to the one or more payers associated with the consumer 108.

At 245, the recommendation component 102 is configured to determine information necessary to create and submit a claim one behalf of consumer 108 to the one or more payers. In some implementations, the recommendation component 102 will request the consumer 108 provide information for the one or more payers. Additionally or alternatively, the recommendation component 102 may be configured to store information about the one or more payers associated with the consumer 108 and retrieve this information when creating a claim on behalf of the consumer 108. In some implementations, the claim created by the recommendation component 102 may identify the consumer 108 and the mobile health application or device being purchased. Once the recommendation component 102 creates the claim, the recommendation component 102 sends the claim to the benefits management component 104.

As will be described in greater detail below with regard to FIGS. 3, at 250 and 255, the benefits management component 104 creates and stores a repository of formulary data structures. Operations 250 and 255 may be performed separately, before the other operations of process 200. Each of the formulary data structures included in the repository lists the mobile health applications for which a particular payer has authorized compensation, as well as the amount and/or type of compensation authorized.

At 260, the benefits management component 104 receives the claim for the mobile health application or device and determines whether the compensation for the mobile health application or device is authorized for the consumer 108. In some implementations, the benefits management component 104 is configured to identify the one or more payers associated with the consumer 108. For example, the benefits management component 104 may receive an indication of the one or more payers with the claim created by the recommendation component 102 or may locally store associations between consumers and payers. Once the benefits management component 104 determines the one or more payers associated with the consumer 108, the benefits management component 104 determines whether the repository of formulary data structures created and stored in operations 250 and 255 includes formularies for the one or more payers.

At 265, for each payer associated with consumer 108 for which the benefits management component 104 finds a formulary in the repository, the benefits management component 104 determines whether the formulary lists the mobile health application or device as being authorized by the payer for compensation, and, if so, the type and amount of compensation that is authorized. If the benefits management component 104 identifies multiple payers associated with the consumer 108, the benefits management component 104 may be configured to determine whether each of the payers authorize compensation. If more than one payer authorizes compensation for a mobile health application or device, the benefits management component 104 may be configured to accumulate the various authorized forms and amounts of compensation. For example, if more than one payer authorizes the payment of a portion of the cost of a mobile health application, the benefits management component 104 may be configured to add the authorized payments together toward the total cost of the mobile health application. In another example, if one payer authorizes the payment of a portion of the cost of a mobile health application and another payer authorizes a future discount on a product or service in exchange for the installation of the mobile health application, the benefits management component 104 may be configured to accumulate information regarding both of these forms of compensation for reporting to the recommendation component 102.

Based on determining whether the consumer 108 is associated with one or more payers and whether the one or more payers have authorized compensation for the mobile health application or device, the benefits management component 104 determines whether to authorize or decline the consumer's claim. If the benefits management component 104 determines that at least one payer is associated with the consumer 108 and that the payer(s) associated with the consumer 108 authorizes compensation for the mobile health application, the benefits management component 104 will send an indication to recommendation component 102 that the claim has been authorized and the amount and type of compensation that has been authorized by the payer(s). If the benefits management component 104 authorizes the claim, the benefits management component 104 may be configured to request payment from the one or more payers for the amount of compensation authorized for the mobile health application. On the other hand, if the benefits management component 104 determines that no payers are associated with the consumer 108 or that none of the payers associated with the consumer 108 authorize compensation for the mobile health application, the benefits management component 104 will send an indication to recommendation component 102 that the claim has been declined.

At 275, the recommendation component 102 receives the indication of whether the claim has been authorized or declined from the benefits management component 104. If the claim has been authorized, the recommendation component 102 determines whether the authorized compensation amount covers the total cost of the mobile health application. If the recommendation component 102 determines that any portion of the cost of the mobile health application is not covered by the one or more payers, the recommendation component 102 may be configured to request payment of the remaining portion of the cost of the mobile health application by the consumer 108.

At 280, the recommendation component 102 receives approval from the consumer 108 to pay for the remaining portion, if any, of the cost of the mobile health application and payment information, if needed. In some implementations, the recommendation component 102 may be configured to request the payment information from the consumer 108 for each transaction. Additionally or alternatively, the recommendation component 102 may be configured to store payment information for the consumer 108 and simply request authorization to use the payment information to complete payment for the mobile health application or device.

Once the recommendation component 102 has arranged for payment of the full cost of the mobile health application or device (or if the mobile application is free), at 285, the recommendation component 102 arranges for the consumer 108 to receive the mobile health application or device. In some implementations, for example, the recommendation component 102 sends an e-mail to the consumer 108 including a link that, when followed by the consumer 108 at 290, will cause the mobile health application or device to be sent to the consumer 108. In some implementations, the recommendation component 102 may be configured to remit payment for the mobile health application to a mobile application store component 106 from which the consumer 108 may obtain the mobile health application and receive a gift code for the mobile health application. The recommendation component 102 send the gift code to the consumer 108, who may provide the gift code to the mobile application store component 106 in order to download the mobile health application from the mobile application store component 106.

Figure 3:
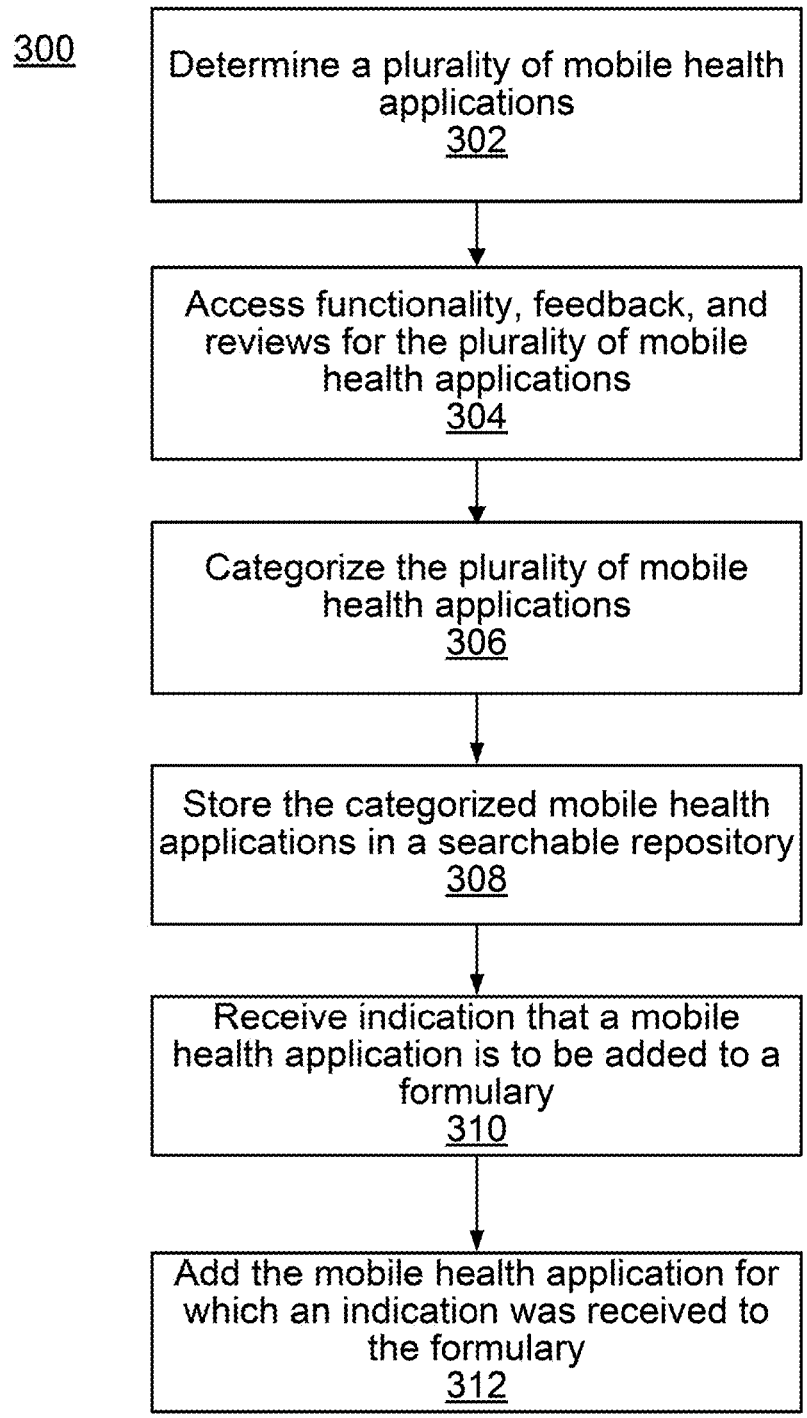
FIG. 3 is a flow chart of an example process for creating a repository of mobile health applications.

FIG. 3 is a flow chart of an example process 300 for creating a repository of mobile health applications and a formulary. The process 300 will be described as being executed by the components of the mobile health application transaction system 100. However, the process 300 may be performed by other components or system to similar effect.

At 302, the benefits management component 104 determines a plurality of mobile health applications. The benefits management component 104 may be configured to receive a list of the mobile health applications from, for example, one or more users (e.g., healthcare providers and/or system administrators), one or more health-related companies (e.g., health insurance companies and/or pharmaceutical companies), one or more mobile application developers or publishers, and/or one or more data suppliers. Additionally or alternatively, the benefits management component 104 may be configured to search for mobile health applications in online databases, mobile application stores (e.g., Apple iTunes or Google play), and/or search engines.

At 304, the benefits management component 104 accesses information regarding the functionality of the one or more mobile health applications, feedback from prescribes/recommenders of the one or more mobile health applications, and/or reviews from users of the one or more mobile health applications. The benefits management component 104 may be configured to use the accessed functionality, feedback, and review information in categorizing the one or more mobile health applications, as will be described with regard to operation 306. Additionally or alternatively, the benefits management component 104 may be configured to determine an index value for each of the one or more mobile health applications based on the accessed functionality, feedback, and review information, as well as any other relevant information.

In some implementations, for example, the benefits management component 104 may be configured to determine an index that indicates a rating for the one or more mobile health applications. For example, the benefits management component 104 may gather information about the functions of a mobile health application, the provider/recommender ratings of the mobile health application, the user ratings of the mobile health application, peer review of the of the mobile health application (e.g., independent reviews and/or sources of verifying information), a number of times the mobile health application has been recommended/prescribed, outcome measures associated with the mobile health application (e.g., information regarding users that have installed the mobile health application and those that have not, which may be used to measure the impact of the mobile health application on a user's prognosis), whether or not the mobile health application is a "connected" application (i.e., a mobile health application that communicates with other applications), and/or a number of payers that have added the mobile health application to a formulary. The benefits management component 104 may be configured to determine a rating for a mobile health application based on at least a portion of this gathered information.

The benefits management component 104 may be configured to receive the accessed functionality, feedback, and review information for each mobile health application from one or more users (e.g., healthcare providers and/or system administrators), one or more health-related companies (e.g., health insurance companies and/or pharmaceutical companies), one or more mobile application developers or publishers, and/or one or more data suppliers. Additionally or alternatively, the benefits management component 104 may be configured to find the accessed functionality, feedback, and review information for the mobile health applications online.

At 306, the benefits management component 104 categorizes the plurality of mobile health applications determined in 302. Based on the functionality, feedback, and review information accessed in operation 304 and/or the determined index of a mobile health application, the benefits management component 104 determines a categorization of the mobile health application. Each mobile health application may be categorized in multiple categories. For example, a mobile health application may be categorized based on one or more health conditions with which it may be associated, categorized based on one or more devices with which it is designed to operate, and/or categorized based on the features of the mobile health application.

At 308, the benefits management component 104 stores the plurality of mobile health applications and the determined categorizations in a repository. The benefits management component 104 provides an interface through which a user may search the repository of mobile health applications. For example, the benefits management component 104 may be configured to allow a user to search for mobile health applications that have been categorized within one or more categories. Through the interface, benefits management component 104 may be configured to receive input from one or more payers in order to create a formulary of mobile health applications. A formulary lists the mobile health applications or devices for which a payer will compensate a user, as well as the type and amount of compensation for the mobile health application that the payer authorizes. A payer may create multiple formularies, where each formulary corresponds to a consumer or group of consumers. For example, a health insurance company may create a formulary for each health plan that it offers to consumers. An example of an interface for the repository of mobile health applications is described below with regard to FIGS. 4A and 4B.

At 310, the benefits management component 104 receives an indication from a payer that one or more mobile health application should be added to one or more formularies associated with the payer. In some implementations, the payer may provide this indication through the interfaces illustrated in FIGS. 4A and 4B. After receiving the indication of the one or more mobile health applications, at 312, the benefits management component 104 adds the one or more mobile health application to the formulary associated with the payer.

Figure 4A:
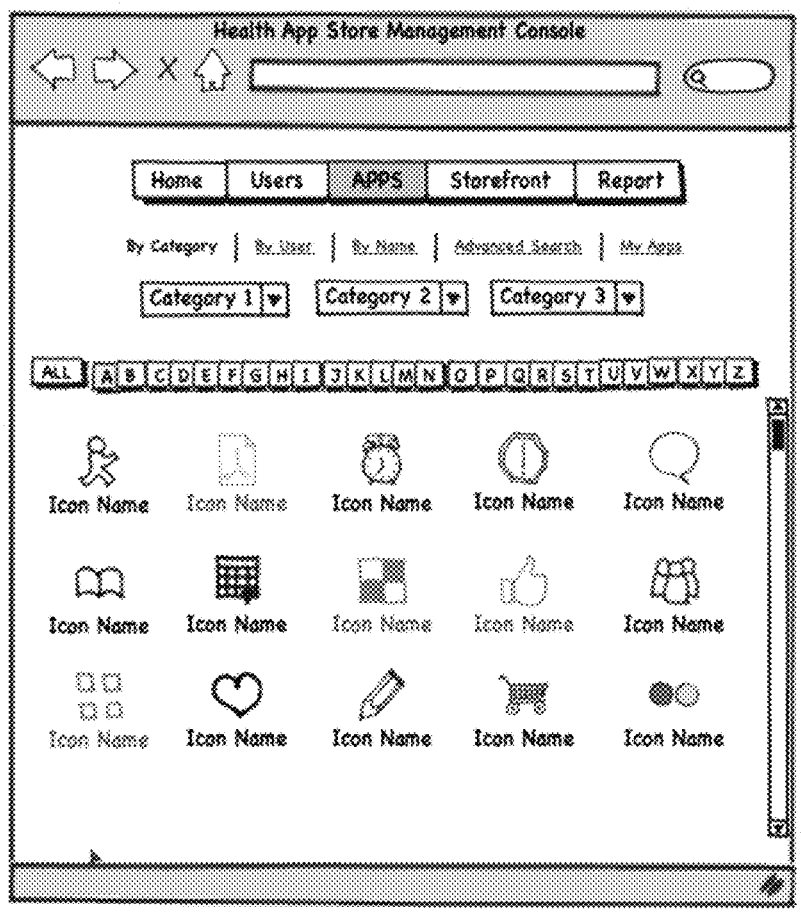
FIGS. 4A and 4B illustrate example user interfaces of a repository of mobile health applications and a formulary.
Figure 4B:
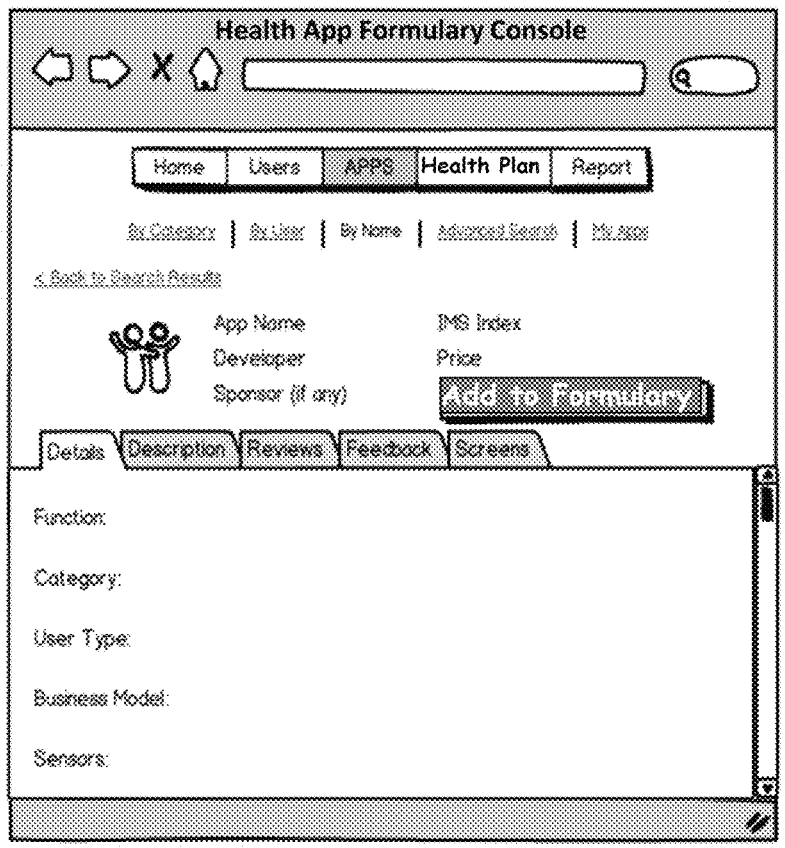

FIGS. 4A and 4B illustrate example user interfaces of a repository of mobile health applications. In particular, FIG. 4A shows an example of an interface 400 of benefits management component 104 through which a user may search mobile health applications. The interface 400 illustrated in FIG. 4A allows a user to search the mobile health applications stored in the repository by keyword, one or more categories, and/or alphabetically. Once a user provides search criteria, the benefits management component 104 searches the repository and presents, though the interface 400, a lists of mobile health applications that meet the search criteria.

If a user selects one of the mobile health applications displayed through interface 400, the benefits management component 104 may display another interface 450 that provides details regarding the mobile health application to the user. The interface 450 may display, for example, the name of the mobile health application, the developer of the mobile health application, a sponsor of the mobile health application (if any), the price of the mobile health application, and/or other identification information of the mobile health application (e.g., an identification number associate for the application within the mobile health application transaction system 100). Additionally or alternatively, the interface 450 may further display a detailed description of the mobile health application, reviews of the mobile health application, and/or screenshots of the mobile health application. Additionally or alternatively, the interface 450 may also provide a mechanism for the user to provide feedback regarding the mobile health application.

In some implementations, the interface 450 may include a mechanism (e.g., a button) by which a user may add the mobile health application being shown to a formulary. If a user selects the mobile health application for addition to a formulary, the benefits management component 104 may add the mobile health application to a formulary through, for example, operations 310 and 312 describes above with regard to FIG. 3. Though interfaces 400 and 450 have been illustrated with a certain layout and described as including certain information, the interfaces provided by benefits management component 104 may take any form that will permit a payer to search for one or more mobile health applications and create one or more formularies.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

The invention claimed is:

1. A computer-implemented method comprising:
receiving, by a computer system and from a prescriber system, data indicating (i) an electronic profile for a particular patient that identifies one or more payer entities, and (ii) a mobile application related to a prescription for the particular patient;
obtaining, by the computer system and from database systems of the one or more payer entities, healthcare data indicating (i) a list of mobile applications that are authorized for use by each of the one or more payer entities, and (ii) available benefits for the electronic profile for the particular patient;
verifying, by the computer system, that (i) the mobile application related to the prescription for the particular patient is included in the list of mobile applications that are authorized for use by each of the one or more payer entities and (ii) the available benefits for the electronic profile for the particular patient included compensation for a cost associated with the mobile application;
determining, by the computer system, to install the mobile application on a device of the particular patient based on verifying that the mobile application is included in the list of mobile applications that are authorized for use by each of the one or more payer entities and that the available benefits for the electronic profile for the particular patient include compensation for the cost associated with the mobile application;
in response to determining to install the mobile application to the mobile device based on verifying that the mobile application is included in the list of mobile applications that are authorized for use by each of the one or more payer entities and that the available benefits for the electronic profile for the particular patient include compensation for the cost associated with the mobile application, transmitting, by the computer system and to the device, an electronic instruction for installing the mobile application on the device, wherein the electronic instruction, when received by the device, causes the device to automatically perform operations specified by the electronic instruction, the operations comprising:
identifying a device type of the device;
determining a third-party mobile application store to obtain a mobile application based on a device type of the device, the third-party mobile application store providing access to mobile applications for execution on the mobile device;
determining an installation protocol for installing the mobile application on the device based on the device type of the device;
obtaining the mobile application from the third-party mobile application store, and
installing the mobile application on the device according to the installation protocol;
receiving, by the computer system and from the device, data indicating the installation of the mobile application on the device; and
in response to receiving the data indicating the installation of the mobile application on the device, establishing, by the computer system, an electronic communication network between the device and a data collection system operatively configured to the computer system, the communication network configured to enable the data collection system to:
provide a hosted environment for executing the mobile application on the device,
obtain sensor data collected by one or more medical devices configured to exchange communications with the device through the mobile application, and
store electronic transaction data submitted on the mobile application relating to the electronic profile for the particular patient.

2. The method of claim 1, wherein determining to install the mobile application on the device of the particular patient comprises:
receiving, by the computer system and from the device of the particular patient, data indicating an electronic reimbursement claim relating to the mobile application; and
validating, by the computer system, the electronic reimbursement claim relating to the mobile application based at least on the obtained healthcare data, wherein validating the electronic reimbursement claim relating to the mobile application comprises:
accessing, from a database of the computer system, a plurality of formulary data structures that are each (i) associated with a healthcare plan, and (ii) include a list of mobile applications approved for compensation by the particular healthcare plan; and
determining that at least one of the plurality of formulary data structures is associated with a particular healthcare plan for the electronic profile for the particular patient; and
determining that the mobile application related to the prescription for the patient is included within the list of mobile applications for the at least one of the plurality of formulary data structures.

3. The method of claim 2, wherein:
the received electronic reimbursement claim relating to the mobile application comprises a payment request to purchase the mobile application from the third-party mobile application store, and
the transmitted communication enabling the device to obtain the mobile application from the third-party mobile application store comprises a payment authorization from the one or more payer entities to purchase the mobile application from the third-party mobile application store.

4. The method of claim 2, wherein validating the electronic reimbursement claim for the mobile application comprises determining, by the computer system and based at least on the obtained healthcare data, that the available benefits for the electronic profile for the patient includes sufficient compensation for the purchase of the mobile application from the third-party mobile application store.

5. The method of claim 2, wherein:
validating the electronic reimbursement claim for the mobile application comprises determining, by the computer system and based at least on the obtained healthcare data, that the available benefits for the electronic profile for the patient does not include sufficient compensation for the purchase of the mobile application from the third-party mobile application store, and
the transmitted electronic communication enabling the device to obtain the mobile application from the third-party mobile application store comprises a user confirmation for partial or total payment for the purchase of the mobile application from the third-party mobile application store.

6. The method of claim 2, validating the electronic reimbursement claim for the mobile application is further based on determining that a prescriber associated with the received data from the prescriber system is authorized to provide the prescription for the particular patient.

7. The method of claim 2, further comprising automatically generating, by the computer system, a repository of mobile applications approved by a plurality of payer entities, comprising:
identifying, by the computer system, a list of mobile applications available on the third-party mobile application store that are related to healthcare;
categorizing, by the computer system, each mobile application within the list of mobile applications based at least on one or more application functions; and
storing, by the computer system and within an electronic database of the computer system, information related to each mobile application within the list of mobile applications, wherein the information comprises an initial cost for the purchase of a particular mobile application, one or more maintenance for a continued use of the particular mobile application.

8. The method of claim 1, wherein the transmitted electronic communication enabling the device to obtain the mobile application from a third-party mobile application store includes a hyperlink that, when activated by the particular patient, causes the installation of the mobile application on the device.

9. The method of claim 1, further comprising:
in response to receiving the data indicating the installation of the mobile application on the device, determining one or more application services offered by an organization associated with the one or more payer entities, the one or more application services being offered through the mobile application to devices that have installed the mobile device using the electronic instruction.

10. A system comprising:
one or more processing devices; and
a non-transitory computer-readable medium coupled to the one or more processing devices having instructions stored thereon which, when executed by the one or more processing devices, cause the one or more processing devices to perform operations comprising:
receiving, by a computer system and from a prescriber system, data indicating (i) electronic profile for a particular patient that identifies one or more payer entities, and (ii) a mobile application related to a prescription for the particular patient;
obtaining, by the computer system and from database systems of the one or more payer entities, healthcare data indicating (i) a list of mobile applications that are authorized for use by each of the one or more payer entities, and GO available benefits for the electronic profile for the particular patient;
verifying, by the computer system, that (i) the mobile application related to the prescription for the particular patient is included in the list of mobile applications that are authorized for use by each of the one or more payer entities and (ii) the available benefits for the electronic profile for the particular patient included compensation for a cost associated with the mobile application;
determining, by the computer system, to install the mobile application on a device of the particular patient based on verifying that the mobile application is included in the list of mobile applications that are authorized for use by each of the one or more payer entities and that the available benefits for the electronic profile for the particular patient include compensation for the cost associated with the mobile application;
in response to determining to install the mobile application on the mobile device based on verifying that the mobile application is included in the list of mobile applications that are authorized for use by each of the one or more payer entities and that the available benefits for the electronic profile for the particular patient include compensation for the cost associated with the mobile application, transmitting, by the computer system and to the device, an electronic instruction for installing the mobile application on the device, wherein the electronic instruction, when received b, the device, causes the device to automatically perform operations specified by the electronic; instruction, the operations comprising:
identifying a device type of the device;
determining a third-party mobile application store to obtain a mobile application based on a device type of the device, the third-party mobile application store providing access to mobile applications for execution on the mobile device;
determining an installation protocol for installing the mobile application on the device based on the device type of the device;
obtaining the mobile application from the third-party mobile application store, and
installing the mobile application on the device according to the installation protocol;
receiving, by the computer system and from the device, data indicating the installation of the mobile application on the device; and in response to receiving the data indicating the installation of the mobile application on the device, establishing, by the computer system, an electronic communication network between the device and a data collection system operatively configured to the computer system, the communication network configured to enable the data collection system to:
provide a hosted environment for executing the mobile application on the device,
obtain sensor data collected by one or more medical devices configured to exchange communications with the device through the mobile application, and
store electronic transaction data submitted on the mobile application relating to the electronic profile for the particular patient.

11. The system of claim 10, wherein determining to install the mobile application on the device of the particular patient comprises:
receiving, by the computer system and from the device of the particular patient, data indicating an electronic reimbursement claim relating to the mobile application; and
validating, by the computer system, the electronic reimbursement claim relating to the mobile application based at least on the obtained healthcare data, wherein validating the electronic reimbursement claim relating to the mobile application comprises:
accessing, from a database of the computer system, a plurality of formulary data structures that are each (i) associated with a healthcare plan, and (ii) include a list of mobile applications approved for compensation by the particular healthcare plan; and
determining that at least one of the plurality of formulary data structures is associated with a particular healthcare plan for the electronic profile for the particular patient; and
determining that the mobile application related to the prescription for the patient is included within the list of mobile applications for the at least one of the plurality of formulary data structures.

12. The system of claim 11, wherein:
the received electronic reimbursement claim relating to the mobile application comprises a payment request to purchase the mobile application from the third-party mobile application store, and
the transmitted communication enabling the device to obtain the mobile application from the third-party mobile application store comprises a payment authorization from the one or more payer entities to purchase the mobile application from the third-party mobile application store.

13. The system of claim 11, wherein validating the electronic reimbursement claim for the mobile application comprises determining, by the computer system and based at least on the obtained healthcare data, that the available benefits for the electronic profile for the patient includes sufficient compensation for the purchase of the mobile application from the third-party mobile application store.

14. The system of claim 11, wherein:
validating the electronic reimbursement claim for the mobile application comprises determining, by the computer system and based at least on the obtained healthcare data, that the available benefits for the electronic profile for the patient does not include sufficient compensation for the purchase of the mobile application from the third-party mobile application store, and
the transmitted electronic communication enabling the device to obtain the mobile application from the third-party mobile application store comprises a user confirmation for partial or total payment for the purchase of the mobile application from the third-party mobile application store.

15. The system of claim 11, wherein the transmitted electronic communication enabling the device to obtain the mobile application from a third-party mobile application store includes a hyperlink that, when activated by the particular patient, causes the installation of the mobile application on the device.

16. The system of claim 11, validating the electronic reimbursement claim for the mobile application is further based on determining that a prescriber associated with the received data from the prescriber system is authorized to provide the prescription for the particular patient.

17. The system of claim 11, further comprising automatically generating, by the computer system, a repository of mobile applications approved by a plurality of payer entities, comprising:
identifying, by the computer system, a list of mobile applications available on the third-party mobile application store that are related to healthcare;
categorizing, by the computer system, each mobile application within the list of mobile applications based at least on one or more application functions; and
storing, by the computer system and within an electronic database of the computer system, information related to each mobile application within the list of mobile applications, wherein the information comprises an initial cost for the purchase of a particular mobile application, one or more maintenance for a continued use of the particular mobile application.

18. A non-transitory computer-readable storage medium encoded with a computer program, the program comprising instructions that when executed by data processing apparatus cause the data processing apparatus to perform operations comprising:
receiving, by a computer system and from a prescriber system, data indicating (i) an electronic profile for a particular patient that identifies one or more payer entities, and (ii) a mobile application related to a prescription for the particular patient;
obtaining, by the computer system and from database systems of the one or more payer entities, healthcare data indicating (i) a list of mobile applications that are authorized for use by each of the one or more payer entities, and (ii) available benefits for the electronic profile for the particular patient;
verifying, by the computer system, that (i) the mobile application related to the prescription for the particular patient is included in the list of mobile applications that are authorized for use by each of the one or more payer entities and (ii) the available benefits for the electronic profile for the particular patient included compensation for a cost associated with the mobile application;
determining, by the computer system, to install the mobile application on a device of the particular patient based on verifying that the mobile application is included in the list of mobile applications that are authorized for use by each of the one or more payer entities and that the available benefits for the electronic profile for the particular patient include compensation for the cost associated with the mobile application;
in response to determining to install the mobile application on the mobile device based on verifying that the mobile application is included in the list of mobile applications that are authorized for use by each of the one or more payer entities and that the available benefits for the electronic profile for the particular patient include compensation for the cost associated with the mobile application, transmitting, by the computer system and to the device, an electronic instruction for installing the mobile application on the device, wherein the electronic instruction, when received b, the device, causes the device to automatically perform operations specified by the electronic; instruction, the operations comprising:

identifying a device type of the device;

determining a third-party mobile application store to obtain a mobile application based on a device type of the device, the third-party mobile application store providing access to mobile applications for execution on the mobile device;

determining an installation protocol for installing the mobile application on the device based on the device type of the device;

obtaining the mobile application from the third-party mobile application store, and installing the mobile application on the device according to the installation protocol;

receiving, by the computer system and from the device, data indicating the installation of the mobile application on the device; and in response to receiving the data indicating the installation of the mobile application on the device, establishing, by the computer system, an electronic communication network between the device and a data collection system operatively configured to the computer system, the communication network configured to enable the data collection system to:

provide a hosted environment for executing the mobile application on the device, obtain sensor data collected by one or more medical devices configured to exchange communications with the device through the mobile application, and store electronic transaction data submitted on the mobile application relating to the electronic profile for the particular patient.

19. The non-transitory computer-readable storage medium of claim 18, wherein determining to install the mobile application on the device of the particular patient comprises:

receiving, by the computer system and from the device of the particular patient, data indicating an electronic reimbursement claim relating to the mobile application; and validating, by the computer system, the electronic reimbursement claim relating to the mobile application based at least on the obtained healthcare data, wherein validating the electronic reimbursement claim relating to the mobile application comprises:

accessing, from a database of the computer system, a plurality of formulary data structures that are each (i) associated with a healthcare plan, and (ii) include a list of mobile applications approved for compensation by the particular healthcare plan; and determining that at least one of the plurality of formulary data structures is associated with a particular healthcare plan for the electronic profile for the particular patient; and determining that the mobile application related to the prescription for the patient is included within the list of mobile applications for the at least one of the plurality of formulary data structures.

20. The device of claim 19, wherein:

the received electronic reimbursement claim relating to the mobile application comprises a payment request to purchase the mobile application from the third-party mobile application. store, and the transmitted communication enabling the device to obtain the mobile application from the third-party mobile application store comprises a payment authorization from the one or more payer entities to purchase the mobile application from the third-party mobile application store.

21. The device of claim 19, wherein validating the electronic reimbursement claim for the mobile application comprises determining, by the computer system and based at least on the obtained healthcare data, that the available benefits for the electronic profile for the patient includes sufficient compensation for the purchase of the mobile application from the third-party mobile application store.

22. The device of claim 19, wherein:

validating the electronic reimbursement claim for the mobile application comprises determining, by the computer system and based at least on the obtained healthcare data, that the available benefits for the electronic profile for the patient does not include sufficient compensation for the purchase of the mobile application from the third-party mobile application store, and the transmitted electronic communication enabling the device to obtain the mobile application from the third-party mobile application store comprises a user confirmation for partial or total payment for the purchase of the mobile application from the third-party mobile application store.

* * * * *

UNITED STATES PATENT AND TRADEMARK OFFICE
CERTIFICATE OF CORRECTION

PATENT NO. : 10,152,761 B2
APPLICATION NO. : 14/046603
DATED : December 11, 2018
INVENTOR(S) : Kress et al.

It is certified that error appears in the above-identified patent and that said Letters Patent is hereby corrected as shown below:

In the Claims

Column 17, Line 56, In Claim 1, delete "included" and insert -- include --.

Column 17, Line 67, In Claim 1, delete "to" and insert -- on --.

Column 20, Line 13, In Claim 10, after "(i)" insert -- an --.

Column 20, Line 21, In Claim 10, delete "GO" and insert -- (ii) --.

Column 20, Line 28, In Claim 10, delete "included" and insert -- include --.

Column 20, Line 48, In Claim 10, delete "b," and insert -- by --.

Column 20, Line 50, In Claim 10, delete "electronic;" insert -- electronic --.

Column 23, Line 9, In Claim 18, delete "b," and insert -- by --.

Column 23, Line 11, In Claim 18, delete "electronic;" insert -- electronic --.

Column 24, Line 23, In Claim 20, delete "application." and insert -- application --.

Signed and Sealed this
Fourth Day of June, 2019

Andrei Iancu
*Director of the United States Patent and Trademark Office*